Dec. 8, 1953 G. J. WOREL 2,661,713
SIGNALING SYSTEM FOR INDICATING INEFFICIENT
VACUUM CONDITIONS IN AUTOMOTIVE ENGINES
Filed Oct. 19, 1951

INVENTOR.
Glen J. Worel
BY
Williamson & Williamson
ATTORNEYS

Patented Dec. 8, 1953

2,661,713

UNITED STATES PATENT OFFICE 2,661,713

SIGNALING SYSTEM FOR INDICATING IN-
EFFICIENT VACUUM CONDITIONS IN AU-
TOMOTIVE ENGINES

Glen J. Worel, Robbinsdale, Minn., assignor to
Thexton Manufacturing Company, Minne-
apolis, Minn., a corporation of Minnesota Application October 19, 1951, Serial No. 252,134

2 Claims. (Cl. 116—138)

This invention relates to simplified apparatus whereby the economy and efficiency of automotive engines may be increased and relates particularly to a signal device and apparatus for indicating to the driver during travel when the partial vacuum of the intake manifold falls below a range for efficient operation and economy.

Very frequently, in driving a motor vehicle the throttle is advanced too rapidly or the transmission mechanism is set in too high a speed ratio or overdrive is utilized in ascending a slope, causing the manifold vacuum to be decreased below a proper operation range for motor efficiency. The consequence in such instances is that more motor fuel is utilized than is required with consequently, a less perfect combustion of the mixture, resulting in waste and impaired operation of the motor.

It is an object of my invention to provide a signal device and signalling system which can be very quickly and easily installed in present day standard motor vehicles or which may be applied as standard equipment by the car manufacturer, for the purpose of indicating noticeably to the driver whenever the manifold vacuum of the engine is below the efficient and economy range.

More specifically it is an object to provide a signal of the class described responsive to the partial vacuum of a hose or line connected with the intake manifold of the automotive engine which through the negative pressure of the system will produce a whistle or audible signal warning the driver so that he may adjust throttle pressure or speed ratio to obtain optimum fuel mixer conditions for the motor of the vehicle.

It is another object to provide a signal system of the class described connected with the conduit for operating a conventional windshield wiper whereby when the partial vacuum of the automotive engine falls below a predetermined amount, a whistle or other audible signal is operated to warn the driver.

These and other objects and advantages of my invention will be more apparent from the following description made in connection with the accompanying drawings wherein like reference characters refer to similar parts throughout the several views and in which.

Figure 3:
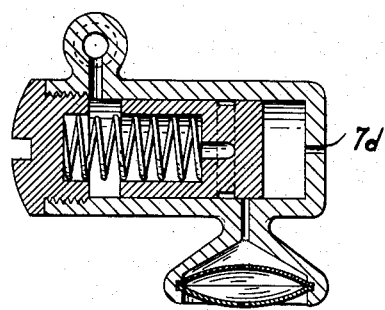
Figure 1:
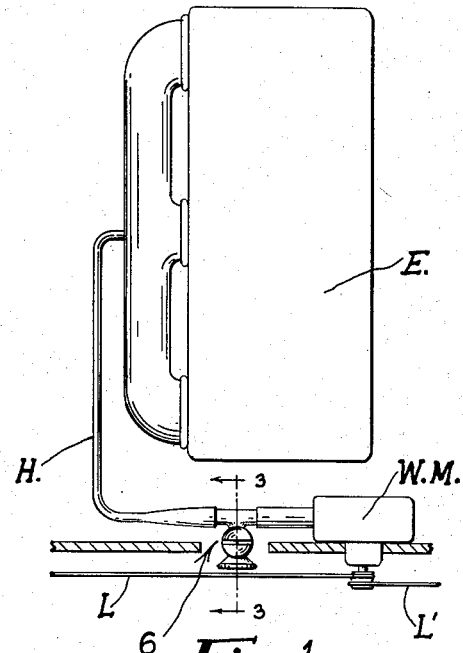
Fig. 1 is a schematic top plan view showing an embodiment of my device and apparatus applied to the conduit which conventionally connects the windshield wiper mechanism with the manifold of an automotive internal gas combustion engine.
Figure 4:
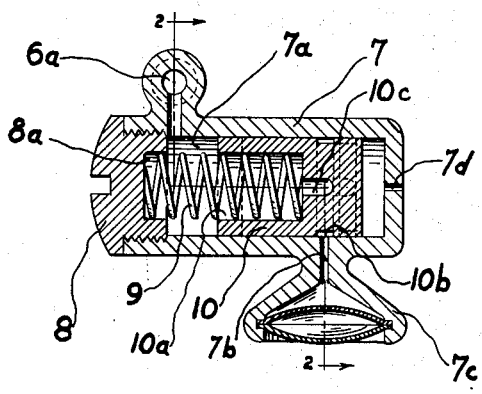

Fig. 3 is a vertical section taken on the line 3—3 of Fig. 1 with the signal valve or piston disposed in normal position when the motor is running with adequate negative pressure produced by the intake manifold; and Fig. 4 is a section similar to Fig. 3 with the signal valve disposed in whistle operating position due to decrease in partial vacuum in the intake manifold of the engine the dotted lines indicating fully opened position of the valve or signalling piston when the motor is not in operation.

In the drawings, as shown in Fig. 1, my signalling apparatus is shown as connected with the conduit (usually in the form of rubber hose) H for supplying negative pressure for operation of the windshield wiper mechanism WM. In the type of windshield wiper mechanism illustrated, the prime mover WM is connected by linkage L and L' with a pair of windshield wipers not shown, at the left and right sides of the motor vehicle windshield.

My apparatus includes a special fitting or body indicated as an entirety by the numeral 6 having a straight conduit portion 6a provided with terminal nipples 6b and 6c which are adapted to be telescoped within the ends of a break in windshield hose H.

Conduit portion 6a communicates by means of a perpendicular port 6d with a cylindrical valve chamber 7a formed in a cylinder 7 which may be integrally formed or rigidly connected with the fitting or conduit 6a. The cylinder 7 as shown, has one end thereof closed by means of a screw plug 8 internally threaded therewith which screw plug has a concentric recess or socket 8a for accommodating the outer end of a compression spring 9. A piston 10 is slidably mounted within cylinder 7 and urged to outward position by spring 9, the inner end of said spring being received in a cylindrical spring recess 10a formed in said piston. Piston 10 outwardly of said spring receiving recess has an annular groove 10b formed therein which is adapted in certain positions of said piston to be alined with a radial whistle port 7b formed in an appropriate portion of cylinder 7. Whistle port 7b communicates with a truncated conical skirt 7c of cylinder 7 which is open at its outer end and is hollow and has mounted therein a conventional type of whistle comprising a diaphragm 11 in the form of a pair of opposed concavo-convex discs having axial apertures or slots therethrough.

Figure 2:
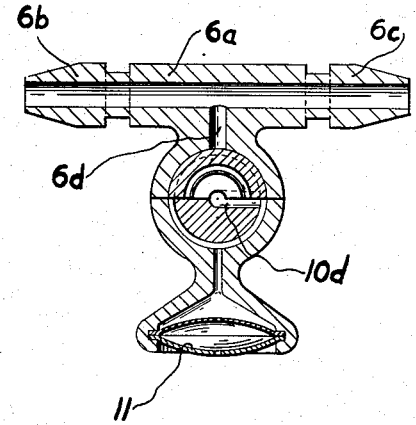
Fig. 2 is a cross section of my signalling device taken approximately upon the line 2—2 of Fig. 4.

The piston 10 has an axial port 10c extending from the spring receiving socket 10a to a radial port 10d (see Fig. 2) which communicates with the annular groove 10b formed in the periphery of the inner portion of the piston.

The cylinder 7 at its rear outer end is provided with a small relief port 7d axially disposed thereof.

The tension of coil spring 9 is such that the spring when mounted as shown, is adequate to overcome the effect of partial vacuum of a predetermined level upon piston 10.

Most automotive vehicles produce upon the intake manifold and windshield hose a partial vacuum varying between 11 to 14 inches of mercury, when the motor is operating efficiently, this partial vacuum increasing somewhat when the motor is idling. Thus, if the efficient partial vacuum of the intake manifold is approximately 12 during driving of the car, a coil spring 9 is selected which will produce a pressure opposing a partial vacuum of approximately 6. The tension of coil spring 9 may be adjusted within limits according to the inward position of the plug 8 threaded into cylinder 7.

When the engine E is stopped, coil spring 9 projects piston 10 to extreme outward position with the outer end flush against the end of the cylinder indicated by dotted lines in Fig. 3. The communicating groove 10b is then in a position past registration with the whistle port 7b. Upon starting of the engine, the negative pressure produced is more than adequate to overcome the distended position of spring 9 and draws the piston inwardly into approximately the position shown in Fig. 3 for normal efficient driving of the car.

When the throttle is advanced too rapidly or when the car is laboring in going up an ascent in high speed or in overdrive, the partial vacuum is lowered and coil spring 9 reacts to position the communicating annular groove 10b in registration with the whistle port 7b. In this connection it is desirable to make the annular groove 10b somewhat wider, say from 1½ to 3 times the diameter of the whistle port 7b.

Air is thus drawn through the whistle mechanism 11 through whistle port 7b to the annular groove 10b and then radially and inward to the axial port 10c, through the radial port 10d. A series of short whistles readily audible to the driver is thus produced, indicating that the throttle is advanced too rapidly or that the gear shift should be operated to select a lower driving gear ratio.

The warning is immediate and the driver very soon learns to heed the same and release of throttle or shift from overdrive becomes almost automatic after the device has been used a short time.

Many drivers do not realize that considerable fuel is wasted and engine efficiency lowered because the throttle is open to too great an extent for the particular driving conditions of the car. The engine will not accelerate as fast when too heavy a mixture is administered to the cylinders as when the throttle is adjusted properly in accordance with the particular driving conditions.

With my signal device, during the operation of the motor vehicle, a driver is instantly warned whenever the partial vacuum of the manifold drops below the efficiency level.

My device may be very quickly and easily installed in practically all conventional types of motor cars, by simply cutting or tapping the hose or conduit which connects the manifold with the usual windshield wiper mechanism. Thereafter, the special fitting or body 6 of my device may be readily connected with the nozzles 6b and 6c fitted into the broken hose connection.

It will of course be understood that various changes may be made in the form, details, arrangement and proportion of the parts without departing from the scope of my invention.

What I claim is:

1. A signal device for indicating when the partial vacuum within a device such as the intake manifold of an automobile engine, is below a predetermined value, comprising a body forming an internal cylinder and having a passage communicating with the inner end of said cylinder and adapted to be connected with the interior of said device, a piston mounted in said cylinder with its inner end subjected to the partial vacuum created therein, a spring for urging said piston outwardly in opposition to the effect of partial vacuum thereon, said piston having a circumferential recess in the periphery thereof, said recess communicating with a passage which is in communication with the inner end of said cylinder and a whistle device connected with the outer portion of said body and having a whistle port extending radially into said cylinder and normally closed by the unrecessed periphery of said piston, but being adapted to communicate with said recess when said piston through dropping of the partial vacuum to which its inner end is subjected, is projected by said spring to a predetermined range of its movement.

2. A signal device for indicating when the partial vacuum within a device such as the intake manifold of an automobile engine is below a predetermined value, comprising a body forming an internal cylinder and having a passage communicating with the inner end of said cylinder and adapted to be connected with said device, a piston mounted in said cylinder with its inner end subjected to the partial vacuum created therein and having a spring receiving seat in the inner portion thereof, a spring interposed between the inner end of said cylinder and the end of said seat for urging said piston outwardly in opposition to the effect of said partial vacuum, said piston having a closed outer end and provided with a circumferential recess in the periphery thereof, said piston also having a passage communicating said recess with the interior of said spring seat and a signal device connected with said body and adapted to be set in operation when subjected to partial vacuum, said device having a communicating port extending substantially radially into the intermediate portion of said cylinder and normally closed by the unrecessed portion of the periphery of said piston but being adapted to communicate with said recess when said piston is projected outwardly to a predetermined range of its movement through action of said spring in excess of a less than normal, partial vacuum imposed upon the inner end of said piston.

GLEN J. WOREL.

References Cited in the file of this patent

UNITED STATES PATENTS

| Number | Name | Date |
|---|---|---|
| 1,080,541 | Copeland | Dec. 9, 1913 |
| 1,403,066 | Battin | Jan. 10, 1922 |
| 1,421,953 | Keilholtz | July 4, 1922 |
| 1,926,180 | Rutherford | Sept. 12, 1933 |
| 2,083,164 | Hanna | June 8, 1937 |